United States Patent [19]
Winick et al.

[11] Patent Number: 5,650,910
[45] Date of Patent: Jul. 22, 1997

[54] BACKBONE SUBSTRATE FOR A COMPUTER

[75] Inventors: Lee Winick; Kenneth Kitlas; Myra Torres, all of San Jose; Erich Selna, Mountain View; Clifford B. Willis, Tracy, all of Calif.

[73] Assignee: Sun Microsystems, Inc., Mountain View, Calif.

[21] Appl. No.: 669,100

[22] Filed: Jun. 26, 1996

[51] Int. Cl.⁶ .................. H05K 7/10; G06F 1/16
[52] U.S. Cl. .......... 361/683; 361/788; 361/789; 439/67
[58] Field of Search .................. 361/683, 684, 361/685, 752, 785, 788, 789, 803; 439/67, 77, 493; 364/708.1; G06F 1/16

[56] References Cited

U.S. PATENT DOCUMENTS 4,997,377  3/1991  Goto et al. .................. 439/67
5,077,683  12/1991 Aydin ........................ 361/685
5,121,297  6/1992  Haas ......................... 361/683
5,392,192  2/1995  Dunn et al. .................. 361/683

Primary Examiner—Leo P. Picard
Assistant Examiner—Lynn D. Feild
Attorney, Agent, or Firm—Blakely Sokoloff Taylor & Zafman

[57] ABSTRACT

An electrical assembly which secures a detached cable/connector assembly to a substrate of a printed circuit board. The assembly has a printed circuit board that is mounted to a first surface of the substrate. The printed circuit board is coupled to an electrical connector assembly by a flexible cable. The electrical connector assembly can be plugged into an auxiliary device such as a CD-ROM. The electrical connector assembly has a tab that is inserted into an aperture located in the second surface of the substrate, to secure the connector assembly when the connector is not attached to the auxiliary device.

19 Claims, 2 Drawing Sheets

BACKBONE SUBSTRATE FOR A COMPUTER

BACKGROUND OF THE INVENTION

1. Field of the Invention

The present invention relates to a packaging assembly of a computer.

2. Description of Related Art

Computer systems are typically packaged in a housing structure which contains a motherboard located within a cavity of a chassis. Mounted to the motherboard are a number of integrated circuit packages. The system also contains a hard disk drive and a separate power supply. The disk drive and power supply are typically connected to the motherboard by a cable/connector assembly. The computer may also contain auxiliary devices such as a CD-ROM which can be added to the system. To provide for such "up-grades" computer manufacturers typically provide an additional cable/connector assembly that allows an end user to plug in the auxiliary device. Manufacturers typically ship the computer with an unattached auxiliary cable/connector assembly. During shipping and handling the detached connector assembly may move within the computer and damage components of the system. It is therefore desirable to secure the detached auxiliary cable/connector assembly during shipping and handling of the computer. It is desirable to secure the connector with existing hardware of the system to minimize the cost of the computer.

SUMMARY OF THE INVENTION

The present invention is an electrical assembly which secures a detached cable/connector assembly to a substrate of a printed circuit board. The assembly has a printed circuit board that is mounted to a first surface of the substrate. The printed circuit board is coupled to an electrical connector assembly by a flexible cable. The electrical connector assembly can be plugged into an auxiliary device such as a CD-ROM. The electrical connector assembly has a tab that is inserted into an aperture located in the second surface of the substrate, to secure the connector assembly when the connector is not attached to the auxiliary device.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
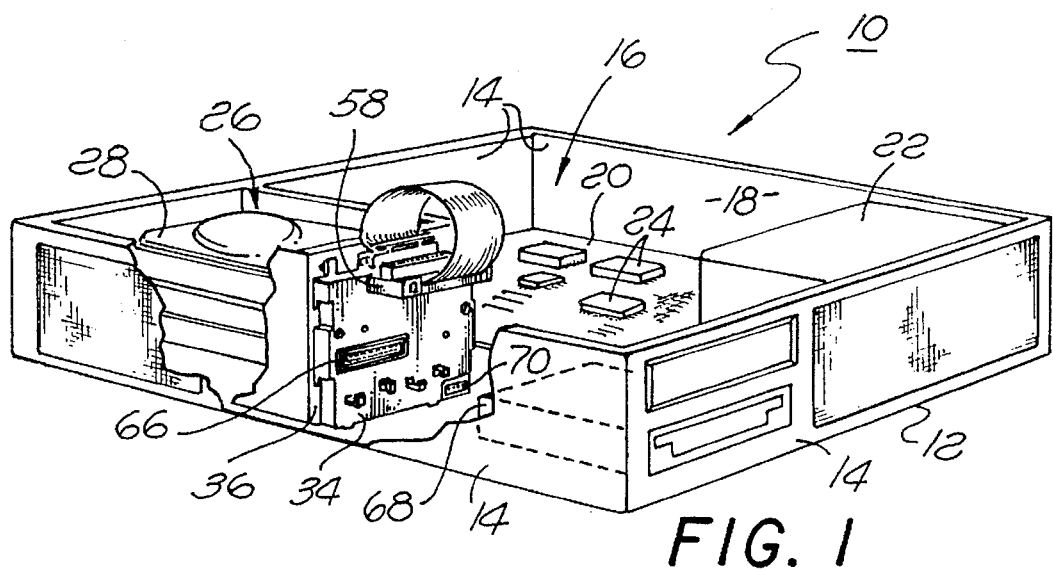
FIG. 1 is a front perspective view of a computer assembly of the present inventor.
Figure 2:
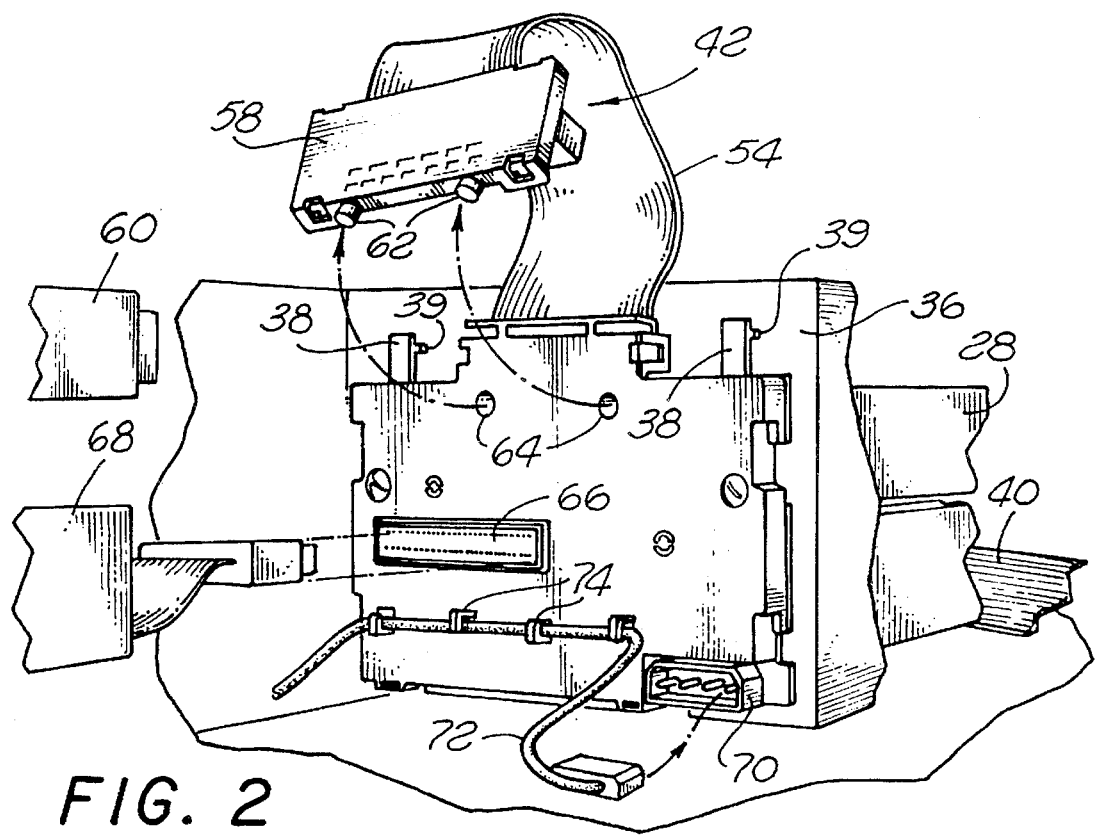
FIG. 2 is a rear perspective view of the computer assembly showing an auxiliary connector that can be secured to a substrate of a backbone assembly.
Figure 3:
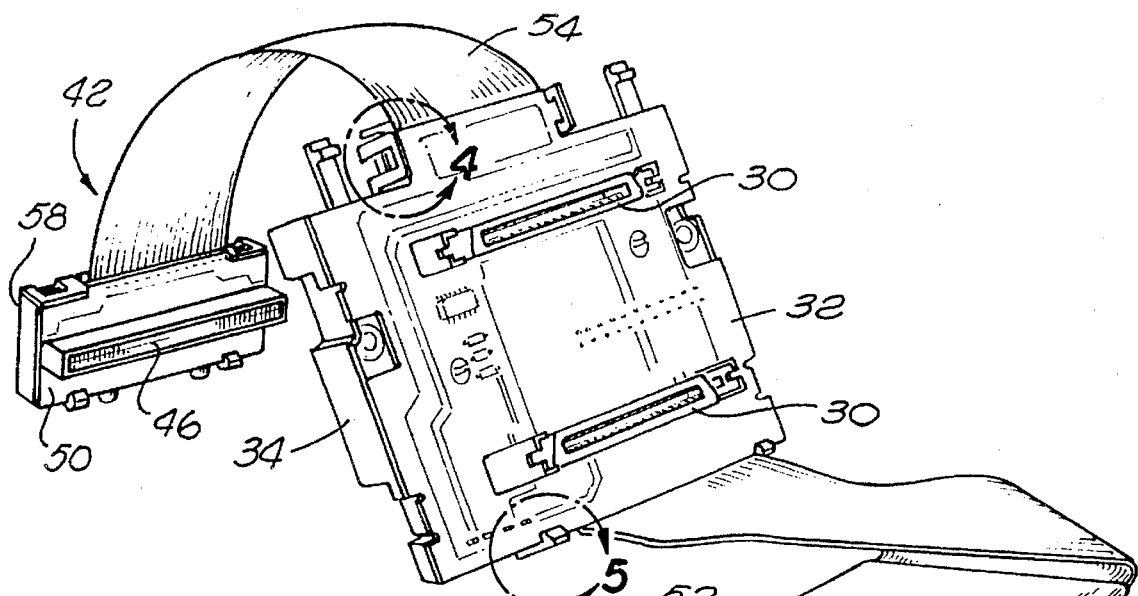
FIG. 3 is a front perspective view of a backbone connector assembly.

Referring to the drawings more particularly by reference numbers, FIGS. 1–3 show a computer assembly 10 of the present invention. The computer 10 includes a chassis 12 that has four outer walls 14 which define a chassis cavity 16. The cavity 16 is typically enclosed by a cover (not shown).

The cavity 16 has a main compartment 18 which contains a motherboard 20 and a power supply 22. Mounted to the motherboard 20 are a plurality of integrated circuit packages 24 that provide the various logic and memory functions of the computer 10.

The chassis 12 has a disk drive bay 26 that receives a at least one hard disk drive unit 28. The disk drives 28 are plugged into a pair of connectors 30 that are mounted to a backbone printed circuit board 32 shown in FIG. 3. The backbone board 32 is attached to a backbone substrate 34 that is supported in a vertical position by a rear wall 36 of the bay 26 as shown in FIG. 2. The substrate 34 may have a pair of finger clips 38 that are inserted into corresponding slots 39 of the rear wall 36 to secure the substrate 34 to the wall 36. The backbone substrate 34 and printed circuit board 32 can be removed from the computer by deflecting the fingers 38 and pulling the substrate 34 out of the chassis 12.

Referring to FIG. 3, extending from the backbone printed circuit board 32 are a motherboard cable/connector assembly 40 and an auxiliary cable/connector assembly 42. Each connector assembly has a connector 44 and 46 that is mounted to a printed circuit board 48 and 50, respectively. The printed circuit boards are connected to cables 52 and 54 and supported by substrates 56 and 58, respectively. The cables 52 and 54 are connected to the printed circuit board 32 to electrically couple the connectors 44 and 46 to the board 32. The motherboard connector 44 plugs into the motherboard 20.

The auxiliary connector 44 can be plugged into an auxiliary device such as a CD-ROM drive. The computer 10 is typically shipped from the manufacturer without the auxiliary drive. As shown in FIG. 2, the auxiliary connector substrate 56 has a pair of tabs 62 that can be inserted into corresponding apertures 64 of the backbone substrate 34 to attach the connector assembly 42 te the substrate 34. The connector attachment prevents the cable/connector assembly 42 from rattling around the chasis 12 when the computer 10 is shipped and handled. Upon delivery, an end user can pull the tabs 62 out of the apertures 64 and plug an auxiliary device 60 into the connector 44.

The assembly may have a floppy connector 66 that is mounted to the backbone printed circuit board 32. The connector 66 can be coupled to a floppy disk drive 68 of the computer 10. The backbone printed circuit board 32 may also have a power connector 70 that is coupled to a flexible cable cable/connector assembly 72 of the power supply 22. The substrate 34 may have a plurality of harness tabs 74 that secure the power supply cable assembly 72.

The backbone printed circuit board 32 has a number of routing busses etched onto both sides of a dielectric substrate. The busses are separated by dielectric material. In the preferred embodiment, the dielectric is no greater than 0.03 inches thick to increase the capacitance and reduce the electrical noise created by the board 32. It being understood that switching noise is inversely proportional to the capacitance of the circuit board 32.

The board busses route the power connector 70 to the disk drive connectors 30, floppy connector 66 and auxiliary connector 46 so that the hard disk drives 28, floppy disk drive 68 and auxiliary device 60 can be powered through the circuit board 32. The circuit board 32 also has signal routing traces that couple the floppy connector 66 and disk drive connectors 30 to the motherboard connector 44, so that the hard disk drives 28 and floppy disk drive 68 are coupled to the motherboard 20.

Figure 4:
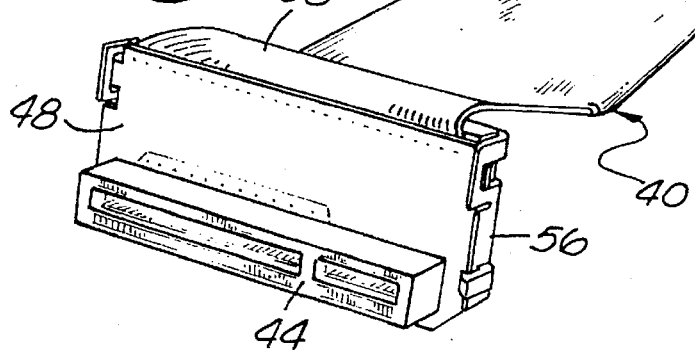
FIG. 4 is an exploded view of a connector subassembly.
Figure 4:
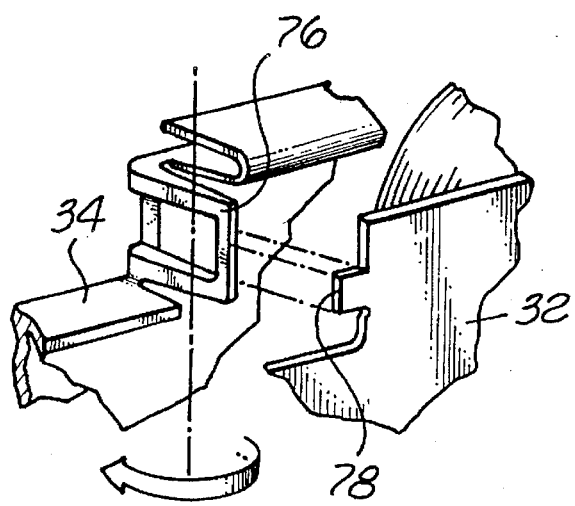
Figure 5:
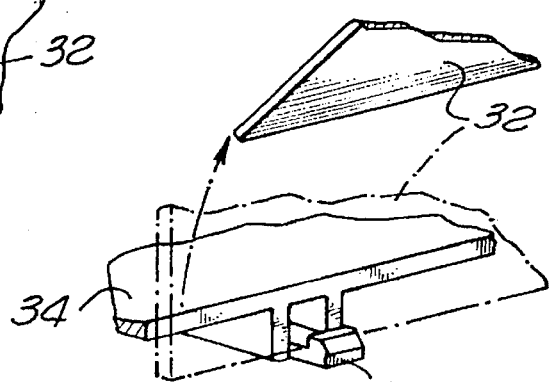
FIG. 5 is an exploded view of a connector subassembly.

As shown in FIGS. 4 and 5, in the preferred embodiment each substrate 44, 56 and 58 has a pair of slotted tabs 76 that receive corresponding edge portions 78 of the printed circuit boards 32, 48 and 50. The other end of the substrates each have a pair of finger tabs 80 that capture the opposite edge of the boards to secure the circuit boards to the substrates. The circuit boards can be removed by deflecting tabs 76 and 80 and separating the boards from the substrates. The tabs allow the circuit boards to be assembled and disassembled without using any fasteners and corresponding fastener tools.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An electronic assembly, comprising:

a first substrate which has a first surface and an opposite second surface, said first substrate further having an aperture;

a first printed circuit board that is mounted to said first substrate;

a first flexible cable connected to said first printed circuit board; and, a first connector assembly connected to said first flexible cable, said first connector assembly having a tab that is inserted into said aperture of said first substrate to secure said first connector assembly to said first substrate.

2. The assembly as recited in claim 1, wherein said first connector assembly includes a first connector mounted to a second printed circuit board, and a second substrate mounted to said second printed circuit board.

3. The assembly as recited in claim 2, further comprising a second connector that is mounted to said first printed circuit board.

4. The assembly as recited in claim 3, further comprising a second flexible cable that is connected to said first printed circuit board and a second connector assembly that is connected to said second flexible cable.

5. The assembly as recited in claim 4, wherein said second connector assembly includes a third connector mounted to a third printed circuit board, and a third substrate mounted to said third printed circuit board.

6. The assembly as recited in claim 5, further comprising a fourth connector that is mounted to said first printed circuit board.

7. The assembly as recited in claim 6, further comprising a chassis wall that supports said first substrate in a vertical position, wherein said first substrate has a tab that engages said wall.

8. A computer assembly, comprising:

a chassis which has a backbone wall;

a backbone substrate that has an aperture, said backbone substrate being supported in a vertical position by said backbone wall of said chassis;

a backbone printed circuit board that is mounted to said backbone substrate;

a disk drive connector mounted to said backbone printed circuit board;

an auxiliary flexible cable connected to said backbone printed circuit board; and, an auxiliary connector assembly connected to said auxiliary flexible cable, said auxiliary connector assembly having a tab that is inserted into said aperture of said backbone substrate to secure said auxiliary connector assembly to said backbone substrate.

9. The assembly as recited in claim 8, further comprising a motherboard flexible cable that is connected to said backbone printed circuit board and a motherboard connector assembly that is connected to said motherboard flexible cable.

10. The assembly as recited in claim 9, wherein said auxiliary connector assembly includes an auxiliary connector mounted to an auxiliary printed circuit board and an auxiliary substrate mounted to said auxiliary printed circuit board.

11. The assembly as recited in claim 10, wherein said motherboard connector assembly includes a motherboard connector mounted to a motherboard connector printed circuit board and a motherboard connector substrate mounted to said motherboard connector printed circuit board.

12. The assembly as recited in claim 11, further comprising a floppy connector that is mounted to said backbone printed circuit board.

13. The assembly as recited in claim 12, wherein said backbone substrate has a tab that engages said backbone wall of said chassis.

14. The assembly as recited in claim 13, further comprising a motherboard that is connected to said motherboard connector.

15. The assembly as recited in claim 14, further comprising a disk drive that is connected to said disk drive connector.

16. The assembly as recited in claim 15, further comprising a floppy disk drive that is connected to said floppy connector.

17. The assembly as recited in claim 16, further comprising a CD-ROM drive that is connected to said auxiliary connector when said tab is disengaged from said aperture.

18. A method for securing a cable/connector assembly, comprising the steps of:

a) providing an assembly that includes;

a substrate which has an aperture;

a printed circuit board that is mounted to said substrate;

a flexible cable connected to said printed circuit board;

a connector assembly connected to said flexible cable, said connector assembly having a tab; and, b) inserting said tab of said connector assembly into said aperture of said substrate to attach said connector assembly to said substrate.

19. The method as recited in claim 18, further comprising the steps of detaching said tab from said aperture and attaching an auxiliary device to said connector assembly.

* * * * *